United States Patent
Sakaki et al.

(10) Patent No.: US 9,617,418 B2
(45) Date of Patent: Apr. 11, 2017

(54) POLYCARBONATE RESIN COMPOSITION AND OPTICAL MOLDED ARTICLE

(71) Applicant: SUMIKA STYRON POLYCARBONATE LIMITED, Chuo-ku, Tokyo (JP)

(72) Inventors: Yoichiro Sakaki, Osaka (JP); Eriko Kida, Osaka (JP)

(73) Assignee: SUMIKA STYRON POLYCARBONATE LIMITED, Tokyo (JP)

( * ) Notice: Subject to any disclaimer, the term of this patent is extended or adjusted under 35 U.S.C. 154(b) by 0 days.

(21) Appl. No.: 15/103,175

(22) PCT Filed: Dec. 5, 2014

(86) PCT No.: PCT/JP2014/006091
§ 371 (c)(1),
(2) Date: Jun. 9, 2016

(87) PCT Pub. No.: WO2015/087526
PCT Pub. Date: Jun. 18, 2015

(65) Prior Publication Data
US 2016/0326365 A1    Nov. 10, 2016

(30) Foreign Application Priority Data

Dec. 10, 2013  (JP) .................. 2013-254902
May 21, 2014   (JP) .................. 2014-104844
Jun. 18, 2014  (JP) .................. 2014-125563
Jun. 18, 2014  (JP) .................. 2014-125566

(51) Int. Cl.
| | |
|---|---|
| C08K 5/51 | (2006.01) |
| C08L 69/00 | (2006.01) |
| C08L 71/02 | (2006.01) |
| G02B 1/04 | (2006.01) |
| F21V 8/00 | (2006.01) |

(52) U.S. Cl.
CPC ............. *C08L 69/00* (2013.01); *C08L 71/02* (2013.01); *G02B 1/04* (2013.01); *G02B 6/0065* (2013.01)

(58) Field of Classification Search
CPC ............................ C08L 69/00; G02B 6/0065
USPC ........................................................ 524/151
See application file for complete search history.

(56) References Cited

U.S. PATENT DOCUMENTS

| | | | |
|---|---|---|---|
| 6,941,057 B1 | 9/2005 | Okamoto et al. | |
| 2009/0093583 A1 | 4/2009 | Kawato et al. | |
| 2009/0190067 A1* | 7/2009 | Hamamatsu | G02B 5/0242 349/64 |
| 2012/0309874 A1* | 12/2012 | Takimoto | C08G 65/20 524/120 |
| 2013/0096259 A1* | 4/2013 | Bett | C08L 75/04 525/185 |

FOREIGN PATENT DOCUMENTS

| | | |
|---|---|---|
| JP | H09-020860 A | 1/1997 |
| JP | H10-055712 A | 2/1998 |
| JP | H11-158364 A | 6/1999 |
| JP | 2004-051700 A | 2/2004 |
| JP | 2006-144026 A | 6/2006 |
| JP | 2007-016079 A | 1/2007 |
| JP | 2010-138263 A | 12/2008 |
| JP | 2011-137060 A | 12/2009 |
| JP | 2010-138263 A | 6/2010 |
| JP | 2011-137060 A | 7/2011 |
| WO | 2015/087526 A1 | 6/2015 |

OTHER PUBLICATIONS

International Search Report and Written Opinion from Japanese Patent Office for Application No. PCT-JP2014-006091, dated Dec. 17, 2014.
English Translation of the Written Opinion from Japanese Patent Office for Application No. PCT-JP2014-006091, mailed Jan. 6, 2015.
English Translation of International Preliminary Report on Patentability for Application No. PCT/JP2014/006091, issued Jun. 14, 2016.

* cited by examiner

*Primary Examiner* — Hui Chin
(74) *Attorney, Agent, or Firm* — The Dobrusin Law Firm, P.C.

(57) ABSTRACT

A polycarbonate resin composition includes: a polycarbonate resin (A); a tetramethylene glycol derivative (B) represented by general formula (1):
$HO(C_4H_8O)_m(C_3H_6O)_nH$ (wherein m and n independently represent an integer of 4 to 60, and m+n represents an integer of 20 to 90); and a phosphite compound (C), an amount of the tetramethylene glycol derivative (B) is 0.005 to 5.0 parts by weight per 100 parts by weight of the polycarbonate resin (A), and an amount of the phosphite compound (C) is 0.005 to 5.0 parts by weight per 100 parts by weight of the polycarbonate resin (A). An optical molded article is obtained by molding the polycarbonate resin composition.

20 Claims, No Drawings

POLYCARBONATE RESIN COMPOSITION AND OPTICAL MOLDED ARTICLE

TECHNICAL FIELD

The present disclosure relates to a polycarbonate resin composition and an optical molded article.

BACKGROUND

For example, as disclosed in Japanese Laid-Open Patent Publication No. H10-055712, a planar light source device incorporated into a liquid crystal display apparatus is equipped with a light guide plate.

As the material of the light guide plate, polymethyl methacrylate (hereinafter, referred to as PMMA) has been hitherto used. However, replacing PMMA with a polycarbonate resin has proceeded since the polycarbonate resin has high heat resistance and high mechanical strength.

The polycarbonate resin is superior to PMMA in mechanical properties, thermal properties, and electrical properties but slightly inferior to PMMA in light transmittance. Therefore, there is a problem that a planar light source device using a light guide plate made of a polycarbonate resin has a lower brightness than one using a light guide plate made of PMMA.

Accordingly, for example, as disclosed in Patent Literature 2 to 6, various resin compositions each including a polycarbonate resin and another material have been proposed in order to obtain a light transmittance equal to or higher than that of PMMA to improve the brightness of a light guide plate.

However, the resin compositions disclosed in Japanese Laid-Open Patent Publication No. H09-020860, Japanese Laid-Open Patent Publication No. H11-158364, Japanese Laid-Open Patent Publication No. 2001-215336, Japanese Laid-Open Patent Publication No. 2004-051700, and International Publication WO 2011/083635 cannot fully meet the requirements as the material for recent light guide plates.

SUMMARY OF THE INVENTION

Problems to be Solved by the Invention

The present disclosure provides a polycarbonate resin composition in which properties inherent in a polycarbonate resin, such as heat resistance and mechanical strength, are not impaired and that has a high light transmittance, and is excellent in light transmittance even when being molded at a high temperature. In addition, the present disclosure provides an optical molded article that is obtained by molding the polycarbonate resin composition, has a high brightness, has a low degree of yellowness and is excellent in hue, and is excellent in brightness and hue even in the case where molding is performed at a high temperature.

Solution to the Problems

A polycarbonate resin composition includes:
a polycarbonate resin (A);
a tetramethylene glycol derivative (B) represented by general formula (1):

$$HO(C_4H_8O)_m(C_3H_6O)_nH \quad (1)$$

(wherein m and n independently represent an integer of 4 to 60, and m+n represents an integer of 20 to 90); and
a phosphite compound (C), wherein
an amount of the tetramethylene glycol derivative (B) is 0.005 to 5.0 parts by weight per 100 parts by weight of the polycarbonate resin (A), and
an amount of the phosphite compound (C) is 0.005 to 5.0 parts by weight per 100 parts by weight of the polycarbonate resin (A).

An optical molded article according to the present disclosure is obtained by molding a polycarbonate resin composition includes:
a polycarbonate resin (A);
a tetramethylene glycol derivative (B) represented by general formula (1):

$$HO(C_4H_8O)_m(C_3H_6O)_nH \quad (1)$$

(wherein m and n independently represent an integer of 4 to 60, and m+n represents an integer of 20 to 90); and
a phosphite compound (C), wherein
an amount of the tetramethylene glycol derivative (B) is 0.005 to 5.0 parts by weight per 100 parts by weight of the polycarbonate resin (A), and
an amount of the phosphite compound (C) is 0.005 to 5.0 parts by weight per 100 parts by weight of the polycarbonate resin (A).

Advantageous Effects of the Invention

In the polycarbonate resin composition according to the present disclosure, the properties inherent in the polycarbonate resin, such as heat resistance and mechanical strength, are not impaired, and the polycarbonate resin composition has a high light transmittance, and is excellent in light transmittance even when being molded at a high temperature. In addition, the optical molded article according to the present disclosure is obtained by molding the polycarbonate resin composition, has a high brightness, has a low degree of yellowness, and is excellent in hue, and is excellent in brightness and hue even in the case where molding is performed at a high temperature. Thus, for example, even a thin light guide plate having a thickness of about 0.3 mm is less likely to change in hue to deteriorate its appearance, or the resin itself is less likely to deteriorate through molding at a high temperature, so that the industrial utility value is very high.

DESCRIPTION OF EMBODIMENTS

Hereinafter, embodiments will be described in detail. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description in order to allow a person of ordinary skill in the art to sufficiently understand the present disclosure, and the description are not intended to restrict the subject matter of the scope of the claims.

(Embodiment 1:Polycarbonate Resin Composition)

A polycarbonate resin composition according to Embodiment 1 contains a polycarbonate resin (A), a tetramethylene glycol derivative (B), and a phosphite compound (C).

The polycarbonate resin (A) is a polymer obtained by the phosgene method, in which various dihydroxydiaryl compounds and phosgene are reacted, or by the ester interchange method, in which a dihydroxydiaryl compound and a carbonic ester such as diphenyl carbonate are reacted. A typical example of the polycarbonate resin (A) is a polycarbonate resin produced from 2,2-bis(4-hydroxyphenyl)propane (bisphenol A).

Examples of the dihydroxydiaryl compounds includes, in addition to bisphenol A, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, 2,2-bis(4-hydroxyphenyl-3-methylphenyl)propane, 1,1-bis(4-hydroxy-3-t-butylphenyl)propane, 2,2-bis(4-hydroxy-3-bromophenyl)propane, 2,2-bis(4-hydroxy-3,5-dibromophenyl)propane, and 2,2-bis(4-hydroxy-3,5-dichlorophenyl)propane; bis(hydroxyaryl)cycloalkanes such as 1,1-bis(4-hydroxyphenyl)cyclopentane and 1,1-bis(4-hydroxyphenyl)cyclohexane; dihydroxydiaryl ethers such as 4,4'-dihydroxydiphenyl ether and 4,4'-dihydroxy-3,3'-dimethyl diphenyl ether; dihydroxydiaryl sulfides such as 4,4'-dihydroxy diphenyl sulfide; dihydroxydiaryl sulfoxides such as 4,4'-dihydroxy diphenyl sulfoxide and 4,4'-dihydroxy-3,3'-dimethyl diphenyl sulfoxide; and dihydroxydiaryl sulfones such as 4,4'-dihydroxy diphenyl sulfone, and 4,4'-dihydroxy-3,3'-dimethyl diphenyl sulfone. These compounds may be used singly, or two or more of these compounds may be mixed and used. In addition to these compounds, piperazine, dipiperidyl hydroquinone, resorcin, 4,4'-dihydroxydiphenyl, and the like may be mixed and used.

Furthermore, the above dihydroxydiaryl compound and, for example, a trivalent or higher phenolic compound described below may be mixed and used.

Examples of the trivalent or higher phenolic compound include phloroglucin, 4,6-dimethyl-2,4,6-tri-(4-hydroxyphenyl)-heptene, 2,4,6-dimethyl-2,4,6-tri-(4-hydroxyphenyl)-heptane, 1,3,5-tri-(4-hydroxyphenyl)-benzole, 1,1,1-tri-(4-hydroxyphenyl)-ethane, and 2,2-bis-[4,4-(4,4'-dihydroxydiphenyl)-cyclohexyl]-propane.

The viscosity average molecular weight of the polycarbonate resin (A) is preferably 10000 to 100000 and further preferably 12000 to 30000. When such a polycarbonate resin (A) is produced, a molecular weight modifier, a catalyst, and the like can be used as necessary.

The tetramethylene glycol derivative (B) is represented by general formula (1):

$$HO(C_4H_8O)_m(C_3H_6O)_nH \qquad (1)$$

(wherein m and n independently represent an integer of 4 to 60, and m+n represents an integer of 20 to 90.).

Hitherto, an attempt to add a polyoxy alkylene glycol to improve the light transmittance of a polycarbonate resin has been made. However, since the polyoxy alkylene glycol has insufficient heat resistance, when a polycarbonate resin composition including the polyoxy alkylene glycol is molded at a high temperature, a molded article has a decreased brightness and a decreased light transmittance. On the other hand, the specific tetramethylene glycol derivative (B) represented by general formula (1) is a bifunctional random copolymer and has high heat resistance, and a molded article obtained by molding, at a high temperature, a polycarbonate resin composition including the specific tetramethylene glycol derivative (B) represented by general formula (1) has a high brightness and a high light transmittance.

In addition, the tetramethylene glycol derivative (B) represented by general formula (1) has moderate lipophilicity and thus has excellent compatibility with the polycarbonate resin (A). Therefore, a molded article obtained from a polycarbonate resin composition blended with the tetramethylene glycol derivative (B) also has improved clarity.

Furthermore, by blending the tetramethylene glycol derivative (B) represented by general formula (1), it is possible to restrain shearing heat from being generated more than necessary when the polycarbonate resin composition is molded. In addition, it is also possible to impart releasability to the polycarbonate resin composition, and thus it is not necessary to additionally add a mold release agent such as a polyorganosiloxane compound.

In general formula (1), although m and n are independently an integer of 4 to 60, and m+n is an integer of 20 to 90, further, m and n are independently preferably an integer of 6 to 40, and m+n is preferably an integer of 20 to 60.

The weight average molecular weight of the tetramethylene glycol derivative (B) is preferably 1000 to 4000 and further preferably 2000 to 3000. If the weight average molecular weight of the tetramethylene glycol derivative (B) is less than 1000, there is a possibility that a sufficient effect of improving a light transmittance is not desired. On the other hand, if the weight average molecular weight exceeds 4000, there is a possibility that a light transmittance decreases and a clouding ratio increases.

Examples of a commercially available tetramethylene glycol derivative (B) include Polyserine DCB-2000 (weight average molecular weight: 2000), Polyserine DCB-1000 (weight average molecular weight: 1000), and the like ("Polyserine" is a registered trademark) manufactured by NOF Corporation.

The amount of the tetramethylene glycol derivative (B) is preferably 0.005 to 5.0 parts by weight, more preferably 0.1 to 2.0 parts by weight, and further preferably 0.5 to 1.5 parts by weight, per 100 parts by weight of the polycarbonate resin (A). If the amount of the tetramethylene glycol derivative (B) is less than 0.005 parts by weight, the effect of improving a light transmittance and hue is insufficient. On the other hand, if the amount of the tetramethylene glycol derivative (B) exceeds 5.0 parts by weight, a light transmittance decreases and a clouding ratio increases.

The polycarbonate resin composition according to the present disclosure is blended with the phosphite compound (C) together with the specific tetramethylene glycol derivative (B) represented by general formula (1). By blending the specific tetramethylene glycol derivative (B) and the phosphite compound (C) together as described above, the properties inherent in the polycarbonate resin (A), such as heat resistance and mechanical strength, are not impaired, and a polycarbonate resin composition having an improved light transmittance is obtained.

The phosphite compound (C) is particularly suitably, for example, a compound represented by general formula (2):

[Chem. 1]

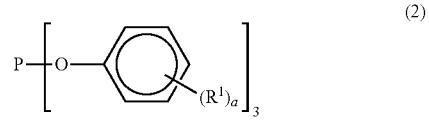

(2)

(wherein $R^1$ represents an alkyl group having 1 to 20 carbon atoms, and a represents an integer of 0 to 3.).

In general formula (2), although $R^1$ is an alkyl group having 1 to 20 carbon atoms, $R^1$ is further preferably an alkyl group having 1 to 10 carbon atoms.

Examples of the compound represented by general formula (2) include triphenyl phosphite, tricresyl phosphite, tris(2,4-di-t-butylphenyl)phosphite, and trisnonylphenyl phosphite. Among these compounds, tris(2,4-di-t-butylphenyl)phosphite is particularly suitable, and is commercially available, for example, as Irgafos 168 ("Irgafos" is a registered trademark of BASF SE) manufactured by BASF SE.

In addition to the compound represented by general formula (2), an example of the phosphite compound (C) is a compound represented by general formula (3):

[Chem. 2]

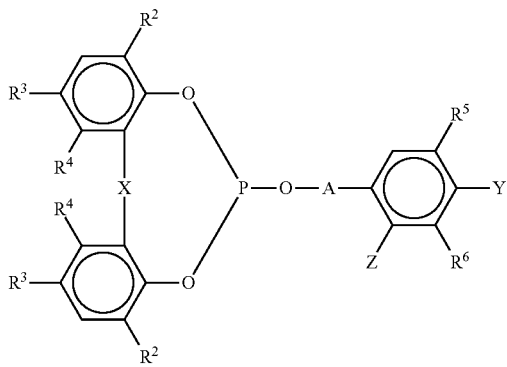

(3)

(wherein $R^2$, $R^3$, $R^5$, and $R^6$ independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group; $R^4$ represents a hydrogen atom or an alkyl group having 1 to 8 carbon atoms; X represents a single bond, a sulfur atom, or a group represented by formula: —$CHR^7$— (wherein $R^7$ represents a hydrogen atom, an alkyl group having 1 to 8 carbon atoms, or a cycloalkyl group having 5 to 8 carbon atoms); A represents an alkylene group having 1 to 8 carbon atoms, or a group represented by formula: *—$COR^8$— (wherein $R^8$ represents a single bond or an alkylene group having 1 to 8 carbon atoms, and * represents atomic bonding at an oxygen side); and either one of Y and Z represents a hydroxyl group, an alkoxy group having 1 to 8 carbon atoms, or an aralkyloxy group having 7 to 12 carbon atoms, and the other of Y and Z represents a hydrogen atom or an alkyl group having 1 to 8 carbon atoms.).

In general formula (3), $R^2$, $R^3$, $R^5$, and $R^6$ independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group.

Here, examples of the alkyl group having 1 to 8 carbon atoms include a methyl group, an ethyl group, an n-propyl group, an i-propyl group, an n-butyl group, an i-butyl group, a sec-butyl group, a t-butyl group, a t-pentyl group, an i-octyl group, a t-octyl group, and a 2-ethylhexyl group. Examples of the cycloalkyl group having 5 to 8 carbon atoms include a cyclopentyl group, a cyclohexyl group, a cycloheptyl group, and a cyclooctyl group. Examples of the alkylcycloalkyl group having 6 to 12 carbon atoms include a 1-methylcyclopentyl group, a 1-methylcyclohexyl group, and a 1-methyl-4-i-propylcyclohexyl group. Examples of the aralkyl group having 7 to 12 carbon atoms include benzyl group, an α-methylbenzyl group, and an α,α-dimethylbenzyl group.

Preferably, $R^2$, $R^3$, and $R^5$ independently represent an alkyl group having 1 to 8 carbon atoms, a cycloalkyl group having 5 to 8 carbon atoms, or an alkylcycloalkyl having 6 to 12 carbon atoms. Particularly, preferably, $R^2$ and $R^5$ are independently a t-alkyl group such as a t-butyl group, a t-pentyl group, a t-octyl group, or the like, a cyclohexyl group, or a 1-methylcyclohexyl group. Particularly, $R^3$ is preferably an alkyl group having 1 to 5 carbon atoms such as a methyl group, an ethyl group, an n-propyl group, an i-propyl group, an n-butyl group, an i-butyl group, an sec-butyl group, a t-butyl group, a t-pentyl group, or the like, and is further preferably a methyl group, a t-butyl group, or a t-pentyl group.

$R^6$ is preferably a hydrogen atom, an alkyl group having 1 to 8 carbon atoms, or a cycloalkyl group having 5 to 8 carbon atoms, and is further preferably a hydrogen atom or an alkyl group having 1 to 5 carbon atoms such as a methyl group, an ethyl group, an n-propyl group, an i-propyl group, an n-butyl group, an i-butyl group, a sec-butyl group, a t-butyl group, a t-pentyl group, or the like.

In general formula (3), $R^4$ represents a hydrogen atom or an alkyl group having 1 to 8 carbon atoms. Examples of the alkyl group having 1 to 8 carbon atoms include the alkyl groups exemplified in the above description of $R^2$, $R^3$, $R^5$, and $R^6$. Particularly, $R^4$ is preferably a hydrogen atom or an alkyl group having 1 to 5 carbon atoms, and is further preferably a hydrogen atom or a methyl group.

In general formula (3), X represents a single bond, a sulfur atom, or a group represented by formula: —$CHR^7$—. Here, $R^7$ in formula: —$CHR^7$— represents a hydrogen atom, an alkyl group having 1 to 8 carbon atoms, or a cycloalkyl group having 5 to 8 carbon atoms. Examples of the alkyl group having 1 to 8 carbon atoms and the cycloalkyl group having 5 to 8 carbon atoms include the alkyl groups and the cycloalkyl groups exemplified in the above description of $R^2$, $R^3$, $R^5$, and $R^6$, respectively. Particularly, X is preferably a single bond, a methylene group, or a methylene group substituted with a methyl group, an ethyl group, an n-propyl group, an i-propyl group, an n-butyl group, an i-butyl group, a t-butyl group, or the like, and is further preferably a single bond.

In general formula (3), A represents an alkylene group having 1 to 8 carbon atoms, or a group represented by formula: *—$COR^8$—. Examples of the alkylene group having 1 to 8 carbon atoms include a methylene group, an ethylene group, a propylene group, a butylene group, a pentamethylene group, a hexamethylene group, an octamethylene group, and a 2,2-dimethyl-1,3-propylene group, and the alkylene group having 1 to 8 carbon atoms is preferably a propylene group. In addition, $R^8$ in formula: *—$COR^8$-represents a single bond or an alkylene group having 1 to 8 carbon atoms. Examples of the alkylene group having 1 to 8 carbon atoms and representing $R^8$ include the alkylene groups exemplified in the above description of A. $R^8$ is preferably a single bond or an ethylene group. In addition, * in formula: *—$COR^8$— is atomic bonding at an oxygen side and indicates that a carbonyl group is bonded to an oxygen atom of a phosphite group.

In general formula (3), either one of Y and Z represents a hydroxyl group, an alkoxy group having 1 to 8 carbon atoms, or an aralkyloxy group having 7 to 12 carbon atoms, and the other of Y and Z represents a hydrogen atom or an alkyl group having 1 to 8 carbon atoms. Examples of the alkoxy group having 1 to 8 carbon atoms include a methoxy group, an ethoxy group, a propoxy group, a t-butoxy group, and a pentyloxy group. Examples of the aralkyloxy group having 7 to 12 carbon atoms include a benzyloxy group, an α-methylbenzyloxy group, and an α,α-dimethylbenzyloxy group. Examples of the alkyl group having 1 to 8 carbon atoms include the alkyl groups exemplified in the above description of $R^2$, $R^3$, $R^5$, and $R^6$.

Examples of the compound represented by general formula (3) include 2,4,8,10-tetra-t-butyl-6-[3-(3-methyl-4-hydroxy-5-t-butylphenyl)propoxy]dibenzo[d,f][1,3,2]dioxaphosphepin, 6-[3-(3,5-di-t-butyl-4-hydroxyphenyl)propoxy]-2,4,8,10-tetra-t-butylbenzo[d,f][1,3,2]dioxaphosphepin, 6-[3-(3,5-di-t-butyl-4-hydroxyphenyl)propoxy]-4,8-di-t-butyl-2,10-dimethyl-12H-dibenzo[d,g][1,3,2]dioxaphosphocin, and 6-[3-(3,5-di-t-butyl-4-hydroxyphenyl)propionyloxy]-4,8-di-t-butyl-2,10-dimethyl-12H-dibenzo[d,g][1,3,2]dioxaphosphocin. Among these compounds, if an obtained polycarbonate resin composition is used particularly in the field in which optical properties are desired, 2,4,8,10-tetra-t-butyl-6-[3-(3-methyl-4-hydroxy-5-t-butylphenyl)propoxy]dibenzo[d,f][1,3,2]dioxaphosphepin is suitable, and is commercially available, for example, as Sumilizer GP ("Sumilizer" is a registered trademark) manufactured by Sumitomo Chemical Co., Ltd.

In addition to the compound represented by general formula (2) and the compound represented by general formula (3), an example of the phosphite compound (C) is a compound represented by general formula (4):

[Chem. 3]

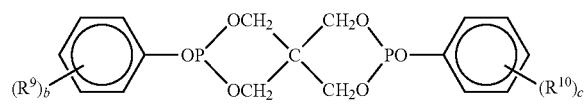

(4)

(wherein $R^9$ and $R^{10}$ independently represent an alkyl group having 1 to 20 carbon atoms, or an aryl group optionally substituted with an alkyl group, and b and c independently represent an integer of 0 to 3.).

As the compound represented by general formula (4), for example, ADK STAB PEP-36 ("ADK STAB" is a registered trademark) manufactured by ADEKA Corporation is commercially available.

The amount of the phosphite compound (C) is preferably 0.005 to 5.0 parts by weight, more preferably 0.01 to 0.5 parts by weight, and further preferably 0.02 to 0.1 parts by weight, per 100 parts by weight of the polycarbonate resin (A). If the amount of the phosphite compound (C) is less than 0.005 parts by weight, the effect of improving a light transmittance and hue is insufficient. On the other hand, also if the amount of the phosphite compound (C) exceeds 5.0 parts by weight, the effect of improving a light transmittance and hue is insufficient.

In the case where the compound represented by general formula (2) is used as the phosphite compound (C), the amount of the compound is preferably 0.005 to 1.0 parts by weight per 100 parts by weight of the polycarbonate resin (A), since the effect of improving a light transmittance and hue is greater.

In addition, in the case where the compound represented by general formula (3) is used as the phosphite compound (C), the amount of the compound is preferably 0.05 to 2.0 parts by weight per 100 parts by weight of the polycarbonate resin (A), since the effect of improving a light transmittance and hue is greater.

Furthermore, various additives such as a thermal stabilizer, an antioxidant, a coloring agent, a mold release agent, a softener, an antistatic agent, and an impact modifier, a polymer other than the polycarbonate resin (A), and the like may be blended into the polycarbonate resin composition according to Embodiment 1 as appropriate such that the effects of the present invention are not impaired.

A method for producing the polycarbonate resin composition is not particularly limited. Regarding the polycarbonate resin (A), the tetramethylene glycol derivative (B), and the phosphite compound (C), and the above various additives, the polymer other than the polycarbonate resin (A), and the like as necessary, the type and the amount of each component are adjusted as appropriate, and examples of the method include a method in which these components are mixed with a known mixing machine such as a tumbler, a ribbon blender, or the like; and a method in which these components are melted and kneaded with an extruder.

Embodiment 1 has been described above as an illustrative example of the technology disclosed in the present application. However, the technology in the present disclosure is not limited thereto, and is also applicable to embodiments in which changes, substitutions, additions, omissions, and/or the like are made as appropriate.

(Embodiment 2: Optical Molded Article)

An optical molded article according to Embodiment 2 is obtained by molding the polycarbonate resin composition according to Embodiment 1 obtained as described above.

A method for producing the optical molded article is not particularly limited, and examples of the method include methods for molding the polycarbonate resin composition by known injection molding, known compression molding, and the like.

The optical molded article obtained as described above is suitable as, for example, a light guide plate, a planar emitter material, a commemorative plaque, and the like.

Embodiment 2 has been described above as an illustrative example of the technology disclosed in the present application. However, the technology in the present disclosure is not limited thereto, and is also applicable to embodiments in which changes, substitutions, additions, omissions, and/or the like are made as appropriate.

EXAMPLES

Hereinafter, the present disclosure will be described more specifically by means of examples, but is not limited to these examples. It is noted that "parts" and "%" are on a weight basis, unless specified otherwise.

The following is used as materials.

1. Polycarbonate resin (A)

Polycarbonate resin synthesized from bisphenol A and carbonyl chloride

Calibre 200-80

(trade name, manufactured by Sumika Styron Polycarbonate Limited, "Calibre" is a registered trademark of Styron Europe Gmbh, viscosity average molecular weight: 15000, referred to as "PC" below).

2. Tetramethylene glycol derivative (B)
Polyoxytetramethylene polyoxypropylene glycol (random type)
Polyserine DCB-2000
(trade name, manufactured by NOF Corporation, weight average molecular weight: 2000, referred to as "compound B" below).
3. Phosphite compound (C)
3-1. Tris(2,4-di-t-butylphenyl)phosphite represented by the following formula:

[Chem. 4]

$$P{-}\!\!\left[\!\!O{-}\!\!\underset{C(CH_3)_3}{\underset{|}{\bigcirc}}\!\!{-}C(CH_3)_3\right]_3$$

Irgafos 168
(trade name, manufactured by BASF SE, referred to as "compound C1" below).
3-2. 2,4,8,10-tetra-t-butyl-6-[3-(3-methyl-4-hydroxy-5-t-butylphenyl)propoxy]dibenzo[d,f][1,3,2]dioxaphosphepin represented by the following formula:

[Chem. 5]

Sumilizer GP
(trade name, manufactured by Sumitomo Chemical Co., Ltd., referred to as "compound C2" below).
4. Others
4-1. Polytetramethylene glycol ether/polyoxyethylene glycol random copolymerization polyether
Polyserine DC-3000E
(trade name, manufactured by NOF Corporation, weight average molecular weight: 3000, referred to as "compound B'" below).
4-2. Polyorganosiloxane compound having a phenyl group, a methoxy group, and a vinyl group.
KR-511
(trade name, manufactured by Shin-Etsu Chemical Co., Ltd., referred to as "KR" below).

(1) First Embodiment

Examples 1-1 to 1-8 and Comparative Examples 1-1 to 1-6

The above respective materials were put together into a tumbler in ratios shown in Table 1, followed by dry blending for 10 minutes. Then, the materials were melted and kneaded with a twin-screw extruder (TEX30α, manufactured by the Japan Steel Works, Ltd.) at a melting temperature of 220° C., to obtain pellets of polycarbonate resin compositions.

Test specimens for each evaluation were produced by using the obtained pellets according to the following method, and were subjected to evaluation. The results are shown in Table 1.

(Method for Producing Test Specimen)
(I) Pre-retention Test Specimen

The obtained pellets were dried at 120° C. for 4 hours or longer, and then a general-purpose test specimen A type (overall length: 168 mm, thickness: 4 mm) specified in JIS K 7139 "Plastics-Test specimens" was produced with an injection molding machine (ROBOSHOT S2000i100A, manufactured by Fanuc Corporation) at a molding temperature of 360° C. and at a mold temperature 80° C. An end face of the test specimen was cut, and the cut end face was subjected to mirror finishing with a mirror finishing machine for resin plate end face (Pla-Beauty PB-500, manufactured by Megaro Technica Co., Ltd.).

(II) Post-retention Test Specimen

The melted pellets were retained within a cylinder of the injection molding machine at 360° C. for 10 minutes, and then a post-retention test specimen was produced by the same method as the method for producing the pre-retention test specimen.

(Evaluation Method for Integrated Transmittance)

A long light path measurement attachment was installed on a spectrophotometer (U-4100, manufactured by Hitachi, Ltd.), a 50-W halogen lamp was used as a light source, and a mask before the light source of 5.6 mm×2.8 mm and a mask before a sample of 6.0 mm×2.8 mm were used. In this state, a spectral transmittance of each of the pre-retention test specimen and the post-retention test specimen per 1 nm in the wavelength range of 380 to 780 nm was measured in the longitudinal direction of the test specimen. The measured spectral transmittances were integrated, and rounded off to the nearest ten to obtain an integrated transmittance of each test specimen. It is noted that an integrated transmittance of 30000 or higher was regarded as being good (shown by ○ in the table), and an integrated transmittance of less than 30000 was regarded as being defective (shown by x in the table).

(Evaluation Method for Degree of Yellowness)

A degree of yellowness of each test specimen was obtained in a 10-degree visual field by using a standard light source D65 on the basis of the spectral transmittance measured in the evaluation method for integrated transmittance. It is noted that a degree of yellowness of 20 or less was regarded as being good (shown by ○ in the table), and a degree of yellowness exceeding 20 was regarded as being defective (shown by x in the table).

TABLE 1

| | | Example | | | | | | | |
|---|---|---|---|---|---|---|---|---|---|
| | | 1-1 | 1-2 | 1-3 | 1-4 | 1-5 | 1-6 | 1-7 | 1-8 |
| Composition (parts) | PC | 100 | 100 | 100 | 100 | 100 | 100 | 100 | 100 |
| | Compound B | 0.05 | 0.2 | 0.4 | 1 | 1 | 1 | 1 | 2 |
| | Compound B' | — | — | — | — | — | — | — | — |
| | Compound C1 | 0.05 | 0.05 | 0.05 | 0.01 | 0.05 | 0.2 | 0.4 | 0.05 |
| | KR | — | — | — | — | — | — | — | — |

TABLE 1-continued

| | | | | | | | | | |
|---|---|---|---|---|---|---|---|---|---|
| Before retention | Intergrated transmittance | 30800 ○ | 31900 ○ | 32100 ○ | 32300 ○ | 32400 ○ | 32600 ○ | 32500 ○ | 31900 ○ |
| | Degree of yellowness | 18.9 ○ | 13.9 ○ | 12.3 ○ | 11.7 ○ | 11.0 ○ | 10.4 ○ | 10.5 ○ | 12.4 ○ |
| After retention | Integrated transmittance | 30400 ○ | 31600 ○ | 32000 ○ | 31500 ○ | 32100 ○ | 31300 ○ | 31000 ○ | 31300 ○ |
| | Degree of yellowness | 19.8 ○ | 14.4 ○ | 12.9 ○ | 12.8 ○ | 12.5 ○ | 11.2 ○ | 15.9 ○ | 14.6 ○ |

| | | | Comparative Example | | | | | |
|---|---|---|---|---|---|---|---|---|
| | | | 1-1 | 1-2 | 1-3 | 1-4 | 1-5 | 1-6 |
| Composition (parts) | PC | | 100 | 100 | 100 | 100 | 100 | 100 |
| | Compound B | | 0.002 | 6 | 1 | 1 | — | — |
| | Compound B' | | — | — | — | — | — | — |
| | Compound C1 | | 0.05 | 0.05 | 0.002 | 6 | 0.05 | 0.05 |
| | KR | | — | — | — | — | — | — |
| Before retention | Intergrated transmittance | | 27800 x | 29000 x | 31500 ○ | 20000 x | 32100 ○ | 31800 ○ |
| | Degree of yellowness | | 31.1 x | 18.0 ○ | 14.8 ○ | 64.5 x | 12.1 ○ | 12.3 ○ |
| After retention | Integrated transmittance | | 27500 x | Decomposition | 27200 x | Decomposition | 27000 x | 28600 x |
| | Degree of yellowness | | 32.0 x | Decomposition | 40.0 x | Decomposition | 41.3 x | 30.9 x |

In each of the polycarbonate resin compositions of Examples 1-1 to 1-8, the specific tetramethylene glycol derivative (B) represented by general formula (1) and the phosphite compound (C) are blended into the polycarbonate resin (A) at the respective specific ratios. Therefore, not only the pre-retention test specimen molded from the polycarbonate resin composition, that is, the test specimen molded without retention within the injection molding machine, but also the post-retention test specimen, that is, the test specimen molded after retention within the cylinder of the injection molding machine at 360° C. for 10 minutes, have high integrated transmittances and have low degrees of yellowness.

As described above, in each of the polycarbonate resin compositions of Examples 1-1 to 1-8, the heat resistance inherent in the polycarbonate resin (A) is not impaired, and the polycarbonate resin composition has a high light transmittance in the visible region, and is excellent in light transmittance even when being molded at a high temperature. In addition, a molded article obtained by molding such a polycarbonate resin composition has a low degree of yellowness and is excellent in hue, and is excellent in hue even in the case where molding is performed at a high temperature.

Since the compound represented by general formula (2) is particularly blended as the phosphite compound (C) in each of the polycarbonate resin compositions of Examples 1-1 to 1-8, the effect of improving the light transmittance in the visible region, the light transmittance in the case where molding is performed at a high temperature, the hue, and the hue in the case where molding is performed at a high temperature is greater due to a synergetic effect of the compound represented by the general formula (2) and the specific tetramethylene glycol derivative (B) represented by general formula (1).

On the other hand, in the polycarbonate resin composition of Comparative Example 1-1, since the amount of the specific tetramethylene glycol derivative (B) is small, both the pre-retention test specimen and the post-retention test specimen have low integrated transmittances and high degrees of yellowness. As described above, the polycarbonate resin composition of Comparative Example 1-1 has a low light transmittance in the visible region, and has a low light transmittance when being molded at a high temperature. In addition, a molded article obtained by molding such a polycarbonate resin composition has a high degree of yellowness and is inferior in hue, and is also inferior in hue in the case where molding is performed at a high temperature.

In the polycarbonate resin composition of Comparative Example 1-2, since the amount of the specific tetramethylene glycol derivative (B) is large, the integrated transmittance of the pre-retention test specimen is low. Moreover, component decomposition occurred in the post-retention test specimen, so that measurement of a spectral transmittance was impossible. As described above, the polycarbonate resin composition of Comparative Example 1-2 is very inferior in heat resistance.

In the polycarbonate resin composition of Comparative Example 1-3, since the amount of the phosphite compound (C) is small, the pre-retention test specimen has a high integrated transmittance and a low degree of yellowness, but the post-retention test specimen has a low integrated transmittance and a high degree of yellowness. As described above, the polycarbonate resin composition of Comparative Example 1-3 is inferior in heat resistance.

In the polycarbonate resin composition of Comparative Example 1-4, since the amount of the phosphite compound (C) is large, the integrated transmittance of the pre-retention test specimen is low, and the degree of yellowness of the pre-retention test specimen is high. Moreover, component decomposition occurred in the post-retention test specimen, so that measurement of a spectral transmittance was impossible. As described above, the polycarbonate resin composition of Comparative Example 1-4 is very inferior in heat resistance.

In the polycarbonate resin composition of Comparative Example 1-5, since the specific tetramethylene glycol derivative (B) represented by general formula (1) is not blended but polytetramethylene glycol ether/polyoxyethylene glycol random copolymerization polyether is blended, the pre-retention test specimen has a high integrated transmittance and a low degree of yellowness, but the post-retention test specimen has a low integrated transmittance and a high degree of yellowness. As described above, the polycarbonate resin composition of Comparative Example 1-5 is inferior in heat resistance.

The polycarbonate resin composition of Comparative Example 1-6 is obtained by blending the polyorganosiloxane compound into the polycarbonate resin composition of Comparative Example 1-5, and the pre-retention test specimen has a high integrated transmittance and a low degree of yellowness. However, the post-retention test specimen has a slightly higher integrated transmittance and a lower degree of yellowness than the post-retention test specimen of the polycarbonate resin composition of Comparative Example 1-5, but the integrated transmittance and the degree of yellowness have great differences from values determined as being good. As described above, the polycarbonate resin composition of Comparative Example 1-6 is inferior in heat resistance.

(2) Second Embodiment

Examples 2-1 to 2-3

Pellets of polycarbonate resin compositions were obtained by the same method as in the first embodiment, except that the above respective materials were blended in ratios shown in Table 2.

Test specimens for each evaluation were produced by using the obtained pellets according to the following method, and were subjected to evaluation. The results are shown in Table 2.

(Method for Producing Test Specimen)

The obtained pellets were dried at 120° C. for 4 hours or longer, and then a general-purpose test specimen A type (overall length: 168 mm, thickness: 4 mm) specified in JIS K 7139 "Plastics-Test specimens" was produced with an injection molding machine (ROBOSHOT S2000i100A, manufactured by Fanuc Corporation) at a molding temperature of 360° C. and at a mold temperature 80° C. An end face of the test specimen was cut, and the cut end face was subjected to mirror finishing with a mirror finishing machine for resin plate end face (Pla-Beauty PB-500, manufactured by Megaro Technica Co., Ltd.).

(Evaluation Method for Integrated Transmittance)

A long light path measurement attachment was installed on a spectrophotometer (U-4100, manufactured by Hitachi, Ltd.), a 50-W halogen lamp was used as a light source, and a mask before the light source of 5.6 mm×2.8 mm and a mask before a sample of 6.0 mm×2.8 mm were used. In this state, a spectral transmittance of the test specimen per 1 nm in the wavelength range of 380 to 780 nm was measured in the longitudinal direction of the test specimen. The measured spectral transmittances were integrated, and rounded off to the nearest ten to obtain an integrated transmittance of the test specimen. It is noted that an integrated transmittance of 30000 or higher was regarded as being good (shown by ○ in the table).

(Evaluation Method for Hue)

Visible light having a wavelength of 450 nm has blue color. Thus, as a 450 nm wavelength light transmittance is higher, a degree of yellowness is lower, and the test specimen is excellent in hue. Thus, the spectral transmittance of the test specimen was measured by the same method as the evaluation method for integrated transmittance, and a hue was evaluated on the basis of a 450 nm wavelength light transmittance. A 450 nm wavelength light transmittance of 65% or higher was regarded as being good (shown by ○ in the table).

TABLE 2

| | | Example | | |
|---|---|---|---|---|
| | | 2-1 | 2-2 | 2-3 |
| Composition (parts) | PC | 100 | 100 | 100 |
| | Compound B | 0.5 | 0.5 | 0.5 |
| | Compound C1 | 0.05 | 0.3 | 0.8 |
| Integrated transmittance | | 32000 | 32300 | 32200 |
| | | ○ | ○ | ○ |
| Light transmittance (%) | | 72 | 73 | 73 |
| | | ○ | ○ | ○ |

In each of the polycarbonate resin compositions of Examples 2-1 to 2-3, the specific tetramethylene glycol derivative (B) represented by general formula (1) and the phosphite compound (C) are blended into the polycarbonate resin (A) at respective specific ratios. Therefore, the test specimen molded from the polycarbonate resin composition has a high integrated transmittance and a high 450 nm wavelength light transmittance.

As described above, in each of the polycarbonate resin compositions of Examples 2-1 to 2-3, the heat resistance inherent in the polycarbonate resin (A) is not impaired, and the polycarbonate resin composition has a high light transmittance in the visible region. In addition, a molded article obtained by molding such a polycarbonate resin composition has a low degree of yellowness and is excellent in hue.

Since the compound represented by general formula (2) is particularly blended as the phosphite compound (C) in each of the polycarbonate resin compositions of Examples 2-1 to 2-3, the effect of improving the light transmittance in the visible region and the hue is greater due to a synergetic effect of the compound represented by the general formula (2) and the specific tetramethylene glycol derivative (B) represented by general formula (1).

(3) Third Embodiment

Examples 3-1 to 3-10 and Comparative Examples 3-1 to 3-4

Pellets of polycarbonate resin compositions were obtained by the same method as in the first embodiment, except that the above respective materials were blended in ratios shown in Table 3.

Test specimens for each evaluation were produced using the obtained pellets by the same method as in the second embodiment, and were subjected to evaluation by the same method as in the second embodiment. The results are shown in Table 3.

In the integrated transmittance evaluation, an integrated transmittance of 28000 or higher was regarded as being good (shown by ○ in the table), and an integrated transmittance of less than 28000 was regarded as being defective (shown by x in the table). In addition, in the hue evaluation, a 450 nm wavelength light transmittance of 55% or higher was regarded as being good (shown by ○ in the table), and a 450 nm wavelength light transmittance of less than 55% was regarded as being defective (shown by x in the table).

TABLE 3

| | | Example | | | | | | | |
|---|---|---|---|---|---|---|---|---|---|
| | | 3-1 | 3-2 | 3-3 | 3-4 | 3-5 | 3-6 | 3-7 | 3-8 |
| Composition (parts) | PC | 100 | 100 | 100 | 100 | 100 | 100 | 100 | 100 |
| | Compound B | 0.01 | 0.1 | 0.5 | 1 | 3 | 0.5 | 0.5 | 0.5 |
| | Compound C2 | 0.5 | 0.5 | 0.5 | 0.5 | 0.5 | 0.01 | 0.1 | 0.25 |
| | Integrated transmittance | 30200 | 30900 | 31000 | 31000 | 29800 | 29200 | 30500 | 30800 |
| | | ○ | ○ | ○ | ○ | ○ | ○ | ○ | ○ |

TABLE 3-continued

| | | | | | | | | |
|---|---|---|---|---|---|---|---|---|
| Light transmittance (%) | 67 ○ | 70 ○ | 70 ○ | 70 ○ | 65 ○ | 63 ○ | 68 ○ | 69 ○ |

| | | Example | | Comparative Example | | | |
|---|---|---|---|---|---|---|---|
| | | 3-9 | 3-10 | 3-1 | 3-2 | 3-3 | 3-4 |
| Composition (parts) | PC | 100 | 100 | 100 | 100 | 100 | 100 |
| | Compound B | 0.5 | 0.5 | 0.002 | 8 | 0.5 | 0.5 |
| | Compound C2 | 1 | 3 | 0.5 | 0.5 | 0.002 | 8 |
| | Integrated transmittance | 31200 ○ | 29800 ○ | 27000 x | 26000 x | 27800 x | 24900 x |
| | Light transmittance (%) | 71 ○ | 65 ○ | 53 x | 50 x | 57 ○ | 46 x |

In each of the polycarbonate resin compositions of Examples 3-1 to 3-10, the specific tetramethylene glycol derivative (B) represented by general formula (1) and the phosphite compound (C) are blended into the polycarbonate resin (A) at respective specific ratios. Therefore, the test specimen molded from the polycarbonate resin composition has a high integrated transmittance and a high 450 nm wavelength light transmittance.

As described above, in each of the polycarbonate resin compositions of Examples 3-1 to 3-10, the heat resistance inherent in the polycarbonate resin (A) is not impaired, and the polycarbonate resin composition has a high light transmittance in the visible region. In addition, a molded article obtained by molding such a polycarbonate resin composition has a low degree of yellowness and is excellent in hue.

On the other hand, in the polycarbonate resin composition of Comparative Example 3-1, since the amount of the specific tetramethylene glycol derivative (B) is small, the integrated transmittance is low and the 450 nm wavelength light transmittance is low. As described above, the polycarbonate resin composition of Comparative Example 3-1 has a low light transmittance in the visible region, and a molded article obtained by molding such a polycarbonate resin composition has a high degree of yellowness and is inferior in hue.

In the polycarbonate resin composition of Comparative Example 3-2, since the amount of the specific tetramethylene glycol derivative (B) is large, the integrated transmittance is low and the 450 nm wavelength light transmittance is low. As described above, the polycarbonate resin composition of Comparative Example 3-2 has a low light transmittance in the visible region, and a molded article obtained by molding such a polycarbonate resin composition has a high degree of yellowness and is inferior in hue.

In the polycarbonate resin composition of Comparative Example 3-3, since the amount of the phosphite compound (C) is small, the integrated transmittance is low. As described above, the polycarbonate resin composition of Comparative Example 3-3 has a low light transmittance in the visible region.

In the polycarbonate resin composition of Comparative Example 3-4, since the amount of the phosphite compound (C) is large, the integrated transmittance is low and the 450 nm wavelength light transmittance is low. As described above, the polycarbonate resin composition of Comparative Example 3-4 has a low light transmittance in the visible region, and a molded article obtained by molding such a polycarbonate resin composition has a high degree of yellowness and is inferior in hue.

(4) Fourth Embodiment

Examples 4-1 to 4-3 and Comparative Examples 4-1 and 4-2

Pellets of polycarbonate resin compositions were obtained by the same method as in the first embodiment, except that the above respective materials were blended in ratios shown in Table 4.

Test specimens for each evaluation were produced using the obtained pellets by the same method as in the second embodiment, and were subjected to evaluation by the same method as in the second embodiment. The results are shown in Table 4.

In the integrated transmittance evaluation, an integrated transmittance of 28000 or higher was regarded as being good (shown by ○ in the table), and an integrated transmittance of less than 28000 was regarded as being defective (shown by x in the table). In addition, in the hue evaluation, a 450 nm wavelength light transmittance of 55% or higher was regarded as being good (shown by ○ in the table), and a 450 nm wavelength light transmittance of less than 55% was regarded as being defective (shown by x in the table).

TABLE 4

| | | Example | | | Comparative Example | |
|---|---|---|---|---|---|---|
| | | 4-1 | 4-2 | 4-3 | 4-1 | 4-2 |
| Composition (parts) | PC | 100 | 100 | 100 | 100 | 100 |
| | Compound B | 0.5 | 0.5 | 0.5 | 0.5 | 0.5 |
| | Compound C1 | 0.05 | 0.3 | 0.8 | 0.001 | 5.5 |
| | Compound C2 | 0.5 | 0.5 | 0.5 | 0.001 | 0.5 |
| | Integrated transmittance | 31100 ○ | 30200 ○ | 28300 ○ | 27700 x | 18500 x |
| | Light transmittance (%) | 70 ○ | 67 ○ | 59 ○ | 57 ○ | 19 x |

In each of the polycarbonate resin compositions of Examples 4-1 to 4-3, the specific tetramethylene glycol derivative (B) represented by general formula (1) and the phosphite compound (C) are blended into the polycarbonate resin (A) at respective specific ratios. Therefore, the test specimen molded from the polycarbonate resin composition has a high integrated transmittance and a high 450 nm wavelength light transmittance.

As described above, in each of the polycarbonate resin compositions of Examples 4-1 to 4-3, the heat resistance inherent in the polycarbonate resin (A) is not impaired, and the polycarbonate resin composition has a high light transmittance in the visible region. In addition, a molded article obtained by molding such a polycarbonate resin composition has a low degree of yellowness and is excellent in hue.

Since the compound represented by general formula (2) is particularly blended as the phosphite compound (C) in each of the polycarbonate resin compositions of Examples 4-1 to 4-3, the effect of improving the light transmittance in the visible region and the hue is greater due to a synergetic effect of the compound represented by the general formula (2) and the specific tetramethylene glycol derivative (B) represented by general formula (1).

On the other hand, in the polycarbonate resin composition of Comparative Example 4-1, since the amount of the phosphite compound (C) is small, the integrated transmittance is low. As described above, the polycarbonate resin composition of Comparative Example 4-1 has a low light transmittance in the visible region.

In the polycarbonate resin composition of Comparative Example 4-2, since the amount of the phosphite compound (C) is large, the integrated transmittance is low and the 450 nm wavelength light transmittance is low. As described above, the polycarbonate resin composition of Comparative Example 4-2 has a low light transmittance in the visible region, and a molded article obtained by molding such a polycarbonate resin composition has a high degree of yellowness and is inferior in hue.

As presented above, the embodiments have been described as an example of the technology according to the present disclosure. For this purpose, the detailed description is provided.

Therefore, components in the detail description may include not only components essential for solving problems, but also components that are provided to illustrate the above described technology and are not essential for solving problems. Therefore, such inessential components should not be readily construed as being essential based on the fact that such inessential components are mentioned in the detailed description.

Further, the above described embodiments have been described to exemplify the technology according to the present disclosure, and therefore, various modifications, replacements, additions, and omissions may be made within the scope of the claims and the scope of the equivalents thereof.

INDUSTRIAL APPLICABILITY

The present disclosure can be suitably used as optical molded articles such as a light guide plate, a planar emitter material, and a commemorative plaque.

The invention claimed is:

1. A polycarbonate resin composition comprising:
a polycarbonate resin (A);
a tetramethylene glycol derivative (B) represented by general formula (1):

$$HO(C_4H_8O)_m(C_3H_6O)_nH \qquad (1)$$

wherein m and n independently represent an integer of 4 to 60, and m+n represents an integer of 20 to 90; and
a phosphite compound (C), wherein
an amount of the tetramethylene glycol derivative (B) is 0.005 to 5.0 parts by weight per 100 parts by weight of the polycarbonate resin (A), and
an amount of the phosphite compound (C) is 0.005 to 5.0 parts by weight per 100 parts by weight of the polycarbonate resin (A).

2. The polycarbonate resin composition according to claim 1, wherein the phosphite compound (C) is at least a compound represented by general formula (2):

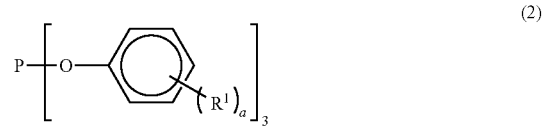

wherein $R^1$ represents an alkyl group having 1 to 20 carbon atoms, and a represents an integer of 0 to 3.

3. The polycarbonate resin composition according to claim 2, wherein the compound represented by general formula (2) is tris(2,4-di-t-butylpbenyl)phosphite.

4. The polycarbonate resin composition according to claim 2, wherein the amount of the compound represented by general formula (2) is 0.005 to 1.0 parts by weight per 100 parts by weight of the polycarbonate resin (A).

5. The polycarbonate resin composition according to claim 1, wherein the phosphite compound (C) is at least a compound represented by general formula (3):

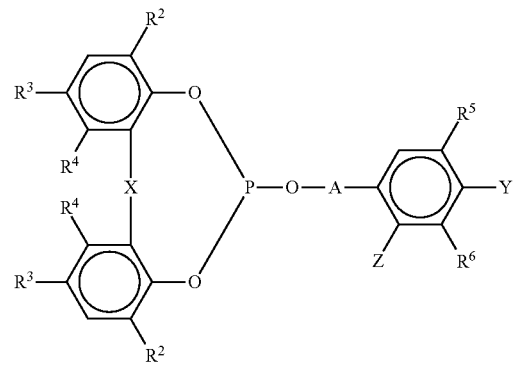

wherein $R^2$, $R^3$, $R^5$, and $R^6$ independently represent a hydrogen atom, an alkyl group having 1 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group;
$R^4$ represents a hydrogen atom or an alkyl group having 1 to 8 carbon atoms;
X represents a single bond, a sulfur atom, or a group represented by formula: —$CHR^7$— wherein $R^7$ represents a hydrogen atom, an alkyl group having 1 to 8 carbon atoms, or a cycloalkyl group having 5 to 8 carbon atoms;
A represents an alkylene group having 1 to 8 carbon atoms, or a group represented by formula: *—$COR^8$— wherein $R^8$ represents a single bond or an alkylene group having 1 to 8 carbon atoms, * represents atomic bonding at an oxygen side; and
either one of Y and Z represents a hydroxyl group, an alkoxy group having 1 to 8 carbon atoms, or an aralkyloxy group having 7 to 12 carbon atoms, and the other of Y and Z represents a hydrogen atom or an alkyl group having 1 to 8 carbon atoms.

6. The polycarbonate resin composition according to claim 5, wherein the compound represented by general formula (3) is 2,4,8,10-tetra-t-butyl-6-[3-(3-methyl-4-hydroxy-5-t-butylphenyl)propoxy]dibenzo[d,f][1,3,2]dioxaphosphepin.

7. The polycarbonate resin composition according to claim 5, wherein the amount of the compound represented by general formula (3) is 0.05 to 2.0 parts by weight per 100 parts by weight of the polycarbonate resin (A).

8. The polycarbonate resin composition according to claim 1, wherein the amount of the tetramethylene glycol derivative (B) is 0.1 to 2.0 parts by weight per 100 parts by weight of the polycarbonate resin (A), and the amount of the phosphite compound (C) is 0.01 to 0.5 parts by weight per 100 parts by weight of the polycarbonate resin (A).

9. The polycarbonate resin composition according to claim 1, wherein the amount of the tetramethylene glycol derivative (B) is 0.5 to 1.5 parts by weight per 100 parts by weight of the polycarbonate resin (A), and the amount of the phosphite compound (C) is 0.02 to 0.1 parts by weight per 100 parts by weight of the polycarbonate resin (A).

10. An optical molded article obtained by molding the polycarbonate resin composition according to claim 1.

11. The optical molded article according to claim 10, wherein the molded article is a light guide plate.

12. The article according to claim 10, wherein the phosphite compound (C) is at least a compound represented by general formula (2):

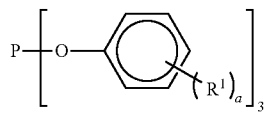

(2)

wherein $R^1$ represents an alkyl group having 1 to 20 carbon atoms, and a represents an integer of 0 to 3.

13. The article according to claim 12, wherein the compound represented by general formula (2) is tris(2,4-di-t-butylphenyl)phosphite.

14. The article according to claim 12, wherein the amount of the compound represented by general formula (2) is 0.005 to 1.0 parts by weight per 100 parts by weight of the polycarbonate resin (A).

15. The article according to claim 10, wherein the phosphite compound (C) is at least a compound represented by general formula (3):

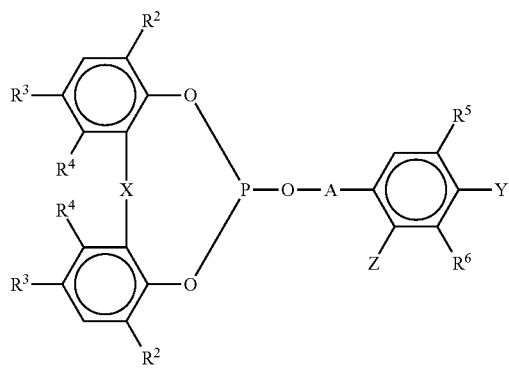

(3)

wherein $R^2$, $R^3$, $R^5$, and $R^6$ independently represent a hydrogen atom, an alkyl group having 1 to 8 carbon atoms, a cycloalkyl group having 5 to 8 carbon atoms, an alkylcylcycloalkyl group having 6 to 12 carbon atoms, an aralkyl group having 7 to 12 carbon atoms, or a phenyl group;

$R^4$ represents a hydrogen atom or an alkyl group having 1 to 8 carbon atoms;

X represents a single bond, a sulfur atom, or a group represented by formula: $-CHR^7-$ wherein $R^7$ represents a hydrogen atom, an alkyl group having 1 to 8 carbon atoms, or a cycloalkyl group having 5 to 8 carbon atoms;

A represents an alkylene group having 1 to 8 carbon atoms, or a group represented by formula: $*-COR^8-$ wherein $R^8$ represents a single bond or an alkylene group having 1 to 8 carbon atoms, * represents atomic bonding at an oxygen side; and, either one of Y and Z represents a hydroxyl group, an alkoxy group having 1 to 8 carbon atoms, or an aralkyloxy group having 7 to 12 carbon atoms, and the other of Y and Z represents a hydrogen atom or an alkyl group having 1 to 8 carbon atoms.

16. The article according to claim 15, wherein the compound represented by general formula (3) is 2,4,8,10-tetra-t-butyl-6-[3-(3-methyl-4-hydroxy-5-t-butylphenyl)propoxy]dibenzo [d,f][1,3,2]dioxaphosphepin.

17. The article according to claim 15, wherein the amount of the compound represented by general formula (3) is 0.05 to 2.0 parts by weight per 100 parts by weight of the polycarbonate resin (A).

18. The article according to claim 10, wherein the amount of the tetramethylene glycol derivative (B) is 0.1 to 2.0 parts by weight per 100 parts by weight of the polycarbonate resin (A), and the amount of the phosphite compound (C) is 0.01 to 0.5 parts by weight per 100 parts by weight of the polycarbonate resin (A).

19. The article according to claim 10, wherein the amount of the tetramethylene glycol derivative (B) is 0.5 to 1.5 parts by weight per 100 parts by weight of the polycarbonate resin (A), and the amount of the phosphite compound (C) is 0.02 to 0.1 parts by weight per 100 parts by weight of the polycarbonate resin (A).

20. The polycarbonate resin composition according to claim 1, wherein the composition produces a specimen having an integrated transmittance of 28000 or higher and a degree of yellowness of 20 or less.

* * * * *